United States Patent
Maughan

[11] Patent Number: 5,961,219
[45] Date of Patent: Oct. 5, 1999

[54] SPLIT TAPER BUSHING

[75] Inventor: Garth B. Maughan, Delta, Ohio

[73] Assignee: Dana Corporation, Toledo, Ohio

[21] Appl. No.: 09/041,651

[22] Filed: Mar. 13, 1998

[51] Int. Cl.[6] .................................................. F16C 17/02
[52] U.S. Cl. ...................... 384/220; 384/221; 384/222; 384/273
[58] Field of Search .................................. 384/220, 221, 384/222, 273, 272, 271

[56] References Cited

U.S. PATENT DOCUMENTS

| | | |
|---|---|---|
| 2,544,582 | 3/1951 | Booth . |
| 3,072,448 | 1/1963 | Melton et al. . |
| 3,356,426 | 12/1967 | Fadow . |
| 3,411,803 | 11/1968 | Melton et al. . |
| 4,401,198 | 8/1983 | Kunczynski . |
| 5,024,283 | 6/1991 | Deli . |
| 5,328,160 | 7/1994 | McLaughlin ............................. 384/273 |

*Primary Examiner*—Lenard A. Footland
*Attorney, Agent, or Firm*—Kader, Fishman & Grauer PLLC

[57] ABSTRACT

A split taper bushing assembly includes a bearing member, an inner sleeve received in a hollow center defined by the bearing and an optional outer sleeve which receives the bearing member in an open center defined therein. The bearing member also includes a tapered skirt. The skirt includes a slit which permits the bearing member to contract during assembly to account for variances in its dimensional tolerances, thus ensuring a proper fit between the bearing member and any mating part. The bearing member is formed using a polyurethane type material. Since such a material resists deterioration due to contact with lubricants commonly used in the automotive industry, the bushing assembly can be relubricated during operation without any destructive affect on the bearing member.

19 Claims, 2 Drawing Sheets

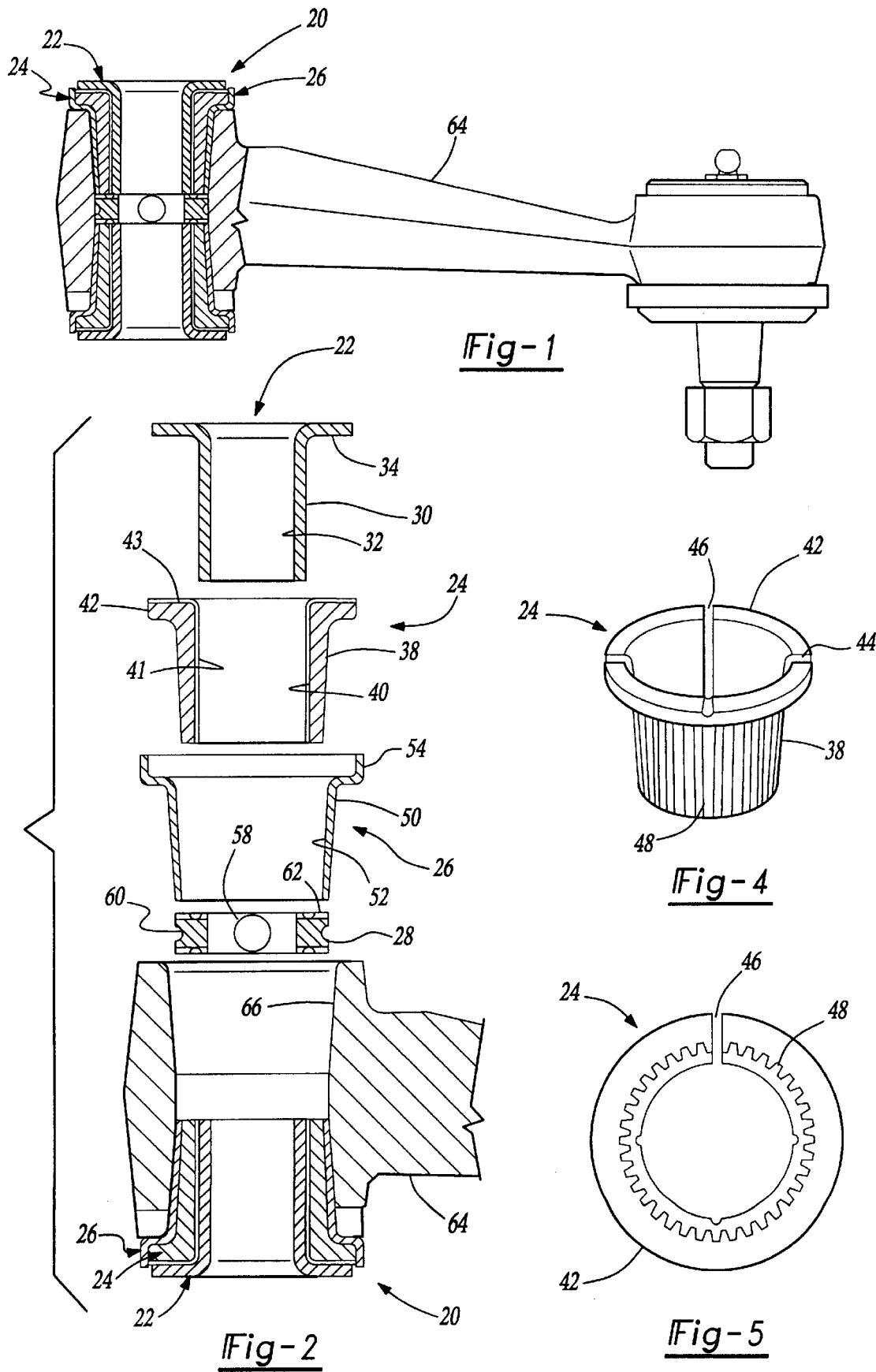

SPLIT TAPER BUSHING

FIELD OF THE INVENTION

The present invention relates generally to the fabrication of a bushing assembly for use in vehicle idler arms. More particularly, the invention relates to a split taper bushing assembly having an inner sleeve, a tapered bearing member and an optional outer sleeve.

BACKGROUND OF THE INVENTION

A conventional idler arm bushing assembly generally comprises a steel outer sleeve, a central rubber sleeve received within the outer sleeve and an inner steel sleeve received within the rubber sleeve. These three components are force-fit assembled under high pressure, and then press fitted into an idler arm housing. However, the components do not provide any provision to compensate for tolerance variations between mating parts to ensure a proper fit between the assembled components.

Additionally, it is typically necessary to apply a lubricant to the rubber sleeve to facilitate assembly. Yet, the lubricant may actually contribute to the deterioration of the rubber sleeve, creating undesirable looseness at the bracket end of the idler arm. With increasing looseness, deflection increases at the opposite end attachment, promoting additional wear.

Finally, conventional idler arm assemblies do not include any provision for relubricating the bushing assembly during operation. Thus, it is not possible to provide additional lubrication, even if necessary.

SUMMARY OF THE INVENTION

The present invention is directed to a split taper bushing assembly for use in a vehicular steering system. The bushing assembly includes a bearing member, an inner sleeve and an optional outer sleeve.

The bearing member includes a skirt having tapered sidewalls that surround a cylindrically shaped hollow center as well as a circumferential flange which extends outwardly away from the outer periphery of the skirt. The skirt also includes at least one slit that extends along the longitudinal extent thereof. The slit ensures a proper fit between each of the bushing assembly components by selectively compressing to account for tolerance variances of the mating parts.

To further facilitate assembly, the bearing member may include a plurality of flex-ribs that extend along the longitudinal extent thereof. The flex-ribs include ribs which extend radially inwardly from the outer circumference of the bearing member skirt and define complementary grooves adjacent each rib. When compressed into a mating part, each rib deforms into an adjacent groove, resulting in a configuration that matches the inner surface of the mating part.

The inner sleeve includes a cylindrical body having an annular flange extending radially outwardly from the outer circumference thereof. The inner sleeve is received in the hollow center of the bearing member, and held in place by frictional forces. The annular flange of the inner sleeve bears against the circumferential flange of the bearing member helping to create a tight seal between the two components.

For added strength and wear protection, an optional outer sleeve may be included in the bushing assembly. The outer sleeve includes a tapered sidewall that surrounds an open center and an annular flange extending radially away from the outer periphery of the sidewall. The open center receives the bearing member, resulting in a frictional engagement between the components. The outer sleeve flange receives and carries the circumferential flange.

When assembled in the vehicle idler arm, the bushing assembly may include a spacer between two opposing bushing assemblies. The spacer includes a plurality of zerk holes that receive lubricant from the vehicle lubrication system and a center hole that directs the lubricant the bushing elements. Thus, the spacer permits the bushing assembly to be relubricated during use as needed. Additionally, the spacer contains material stops which prevent excessive deformation of the bushing assembly when under load.

The bushing assembly can be fully assembled and installed in a conventional idler arm without the need for pressure driven assembly tools or equipment, thus reducing the time required for assembly and installation.

BRIEF DESCRIPTION OF THE DRAWINGS

The features and inventive aspects of the present invention will become more apparent upon reading the following detailed description, claims and drawings, of which the following is a brief description:

FIG. 1 is a partial side cross-sectional view showing a bushing formed in accordance with the teachings of the present invention installed in the opposite sides of a vehicle idler arm.

FIG. 2 is an exploded sectional view of the bushing shown in FIG. 1.

FIG. 4 is a perspective view of a bearing member included as an element of the bushing shown in FIG. 1.

FIG. 5 is a bottom plan view of the bearing member shown in FIG. 4.

DESCRIPTION OF THE PREFERRED EMBODIMENTS

Figure 3:
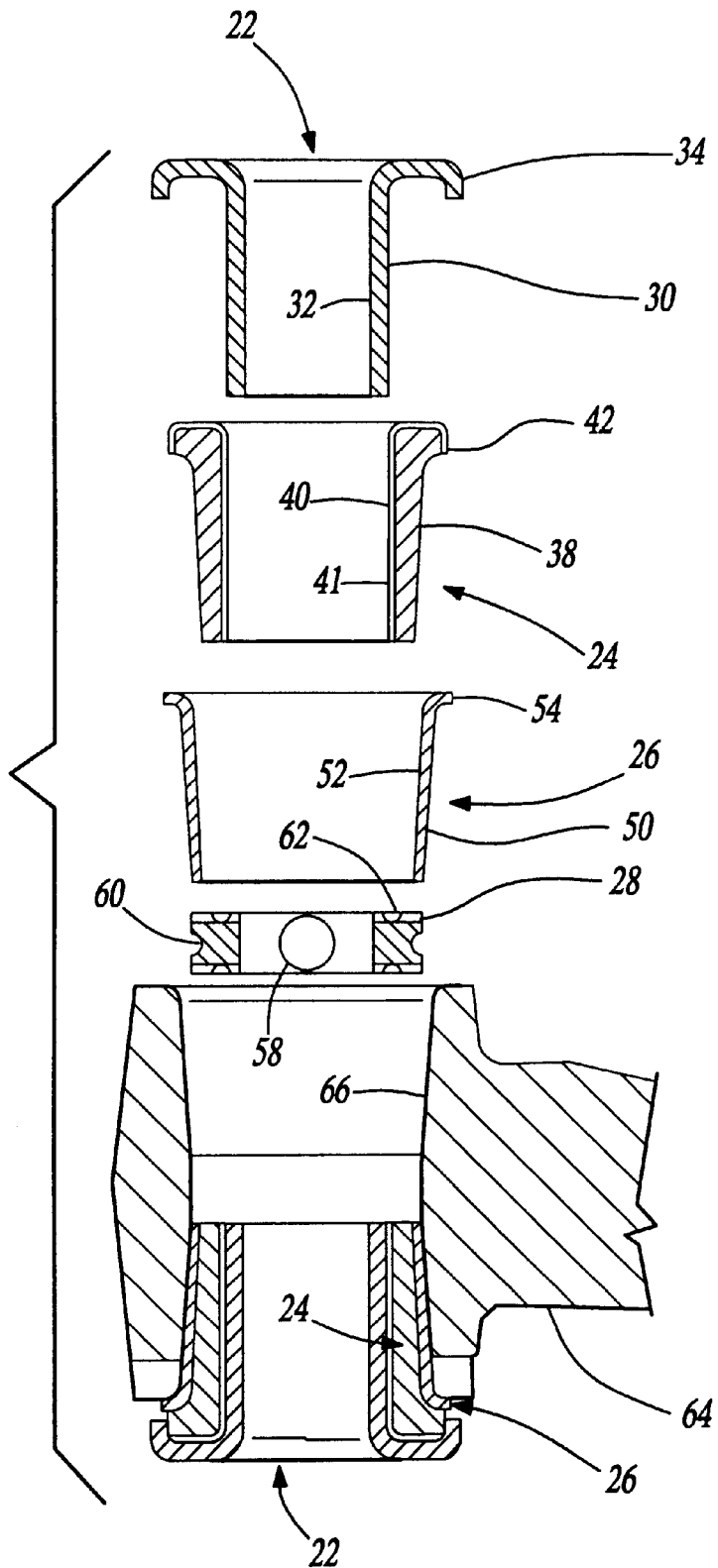
FIG. 3 is a sectional view showing an exploded and assembled view of a second embodiment of the bushing shown in FIG. 1.

FIGS. 1 and 3 show a preferred embodiment of a split taper bushing assembly 20. Constituent components of bushing assembly 20 are an inner sleeve 22, a bearing member 24, and an optional outer sleeve 26. When inserted in idler arm 64, bushing assembly 20 may include a spacer 28.

Inner sleeve 22 includes a cylindrical body 30 and an annular flange 34. Cylindrical body 30 defines an open center 32. Open center 32 receives a fastener such as a pin connector or a nut and bolt for securing the bushing assembly 20 to an idler arm 64. Annular flange 34 extends radially outwardly from the outer periphery of cylindrical body 30 and may be manufactured with a flat or an inverted deep or shallow cup-shaped flange having tapered cone-shaped ends that seat against a mating surface. As described below, a flat flange may result in bushing assembly 20 having enhanced stiffness properties, and an inverted deep cup-shaped flange may result in a more compliant bushing assembly 20 under load. Inner sleeve 22 is constructed of soft or heat treated stamped steel. The choice of material, however, will depend on the intended application of the bushing.

Bearing member 24 includes a circumferential flange 42 and a skirt 38 having tapered sidewalls. Circumferential flange 42 extends radially outwardly from the outer periphery of skirt 38. The sidewalls of skirt 38 defines a conically shaped outer periphery that surrounds a cylindrically shaped hollow center 40. The angle of taper of the outer periphery of skirt 38 may range between 1 and 15 degrees. However, the angle of taper may vary such that the shape of skirt 38 becomes substantially cylindrical. The tapered surface permits mating parts to be compressed tightly together using fasteners such as a nut and bolt, a pin connector or other similar devices.

The outer periphery of skirt 38 includes at least one slit 46. As shown in FIGS. 4 and 5, slit 46 preferably extends along the longitudinal extent of skirt 38 and continues onto the adjacent surface of circumferential flange 42, beginning at the inner peripheral edge and terminating at the outer peripheral edge of the circumferential flange 42. Slit 46 may be formed in various circumferential locations about bearing member 24. For example, slit 46 may be formed only in skirt 38 or circumferential flange 42 or only partially extend along either or both skirt 38 and circumferential flange 42. The circumferential extent of slit 46 will depend on the particular application. However, slit 46 permits bearing member 24 to contract as needed when assembled with a mating part, thereby adjusting the overall dimensions of bearing member 24 to compensate for variances in the dimensional tolerances of either bearing member 24 or the mating part, inner sleeve 22, outer sleeve 26 or idler arm 64. As a result, a bearing seat wear pad 43, a bearing surface located at the exterior top surface of circumferential flange 42, is always fully seated against annular flange 34, or idler arm 64 if bushing assembly 20 does not include inner sleeve 22.

Bearing seat wear pad 43 is integrally formed with circumferential flange 42. However, bearing seat wear pad 43 may be formed as a separate component, and may be treated with a protective coating, such as epoxy, or a plating material such as zinc dichromate or other similar materials to enhance its corrosion resistant properties.

Bearing member 24 preferably includes a plurality of circumferentially spaced grooves 44 through which lubricant is received by bearing member 24. As shown in FIG. 4, grooves 44 extend along the longitudinal extent of skirt 38 and typically continue into circumferential flange 42, terminating at the outer peripheral edge thereof. Grooves 44, however, may be formed only in circumferential flange 42 or skirt 38.

Bearing member 24 is preferably injection molded using an elastomeric polyurethane as known to those skilled in the art. However, other materials having mechanical properties similar to elastomeric polyurethane may be used. A polyurethane material resists deterioration due to contact with lubricants generally used in vehicle steering systems. Consequently, bushing assembly 20 may be lubricated during initial assembly and as needed during operation of a vehicle as described below.

The polyurethane material used to form bearing member 24 may have a stiffness value ranging between 50 and 75 Shore D. Polyurethane material having stiffness values in the identified range provides bearing member 24 with the stiffness and compliance properties often preferred in automotive applications. However, the material used to form bearing member 24 may have a stiffness value outside the identified range as material requirements vary according to the intended application of the bushing assembly 20.

The polyurethane material ensures excellent load absorption and compliance properties for dampening load shock effects to safeguard overall steering linkage functional integrity. The polyurethane material has the added advantage of deflection memory. When moderately loaded, the material remembers its original shape, and upon release of the load, recovers its original shape as long as its maximum stress level has not been exceeded.

To further facilitate load absorption and compliance properties, as well as facilitating the assembly of the bearing with mating parts, a plurality of flex-ribs 48 may be circumferentially spaced about bearing member 24. As shown in FIGS. 4 and 5, flex-ribs 48 include vertically extending ribs and complementary grooves. Flex-ribs 48 are integrally formed with and extend from and around the outer circumference of skirt 38. Flex-ribs 48, however, may be positioned at other locations along bearing member 24. For example, flex-ribs 48 may extend along only a portion of the extent of skirt 38. The ribs deform into adjacent grooves when bearing member 24 is received by outer sleeve 26 or idler arm 64. The size and shape of the ribs and grooves vary according to the intended use of bushing assembly 20. Additionally, flex-ribs 48 facilitate the insertion of bearing member 24 into a mating part by collapsing to the shape of the mating part, which may be the outer sleeve 26.

Outer sleeve 26 includes a sidewall 50 which is tapered to match the taper of skirt 38. Sidewall 50 defines an open center 52 and an annular flange 54 which extends radially outwardly from the outer periphery of the upper end of sidewall 50. Open center 52 tapers from a first diameter at an upper end of outer sleeve 26 to a relatively smaller second diameter at the lower end thereof. In a preferred embodiment, the angle of taper of open center 52 is identical to that of sidewall 50. As will be described below, the outer sleeve 26 receives the bearing member 24.

Outer sleeve 26 may be manufactured of soft or heat treated steel or other materials having similar mechanical properties. Since outer sleeve 26 mates with and receives bearing member 24 as described below, the mechanical properties of bushing assembly 20 may vary depending on the construction of outer sleeve 26. For example, outer sleeve 26 may include a flat or cup-shaped annular flange 54 having tapered cone-shaped ends that seat against a mating part.

Constructing annular flange 54 with a flat flange, as illustrated in FIG. 3, may result in a stiffer bushing assembly 20. For example, a bushing assembly 20 comprising a flat annular flange 34 and bearing member 24 having a thin circumferential flange 42 results in bushing assembly 20 having enhanced stiffness properties when compared with an identical bearing member 24 having a dimensionally thicker circumferential flange 42. The thickness and length of the circumferential flange 42 and the skirt 38 helps determine the compliance properties of the bearing member 24.

A cup-shaped annular flange 54, as illustrated in FIG. 1, may result in either a more compliant or a stiffer bushing assembly 20 depending on the dimensional thickness of bearing member 24. A deep cup-shaped flange may accept a dimensionally thicker circumferential flange 42, resulting in a more compliant bushing assembly 20 when under load. The shallow cup-shaped flange accepts a dimensionally thinner circumferential flange 42, providing enhanced stiffness properties in bushing assembly 20 when compared with a bushing assembly 20 having a dimensionally thicker circumferential flange.

In general, a bearing member 24 having a dimensionally thicker surface area results in a more compliant bearing when compared to an identical bearing member having a dimensionally thinner cross-section. The determination of whether to use a thinner or thicker bearing member depends on the intended use of the bushing assembly. In other words, whether the application requires more or less compliance in the steering system becomes the determining factor.

Bearing assembly 20, when placed in an idler arm 64, may include optional spacer 28, placed in idler arm 64 between two opposing bushing assemblies 20. As shown in FIGS. 1 and 3, spacer 28 is located in idler arm 64, at the innermost extent of bushing assembly 20, and may include zerk holes 60 that receive lubricant from a vehicle lubrication system. Holes 60 facilitate distribution of lubricant to the components of bushing assembly 20. For example, FIG. 2 shows one embodiment of spacer 28, wherein lubricant may be supplied to zerk holes 60. Zerk holes 60 help direct the lubricant into a hole 58 defined by spacer 28. The lubricant enters through hole 58 and is forced out to the components of bushing assembly 20. The lubricant is channeled to bushing assembly 20 by grooves 44 and slit 46. However, it is possible to apply lubricant directly to bushing assembly 20, eliminating the need for optional spacer 28.

Spacer 28 also includes bearing edge material stop 62 which prevents too much bearing end extrusion when bushing assembly 20 is under load. FIG. 2 shows one embodiment of bearing edge material stop 62 as a recess formed in the surface of spacer 28 which terminates at hole 58. Consequently, bearing edge material stop 62 not only prevents excessive deformation of bushing assembly 20 when under load but helps to distribute lubricant applied to bushing assembly 20 through spacer 28.

ASSEMBLY AND OPERATION

The assembled bushing assembly 20 may comprise inner sleeve 22 and bearing member 24. Bearing member 24 frictionally engages inner sleeve 22 at bearing surface 41, formed at the surface of hollow center 40, such that cylindrical body 30 of inner sleeve 22 is slip-fit assembled into hollow center 40. Annular flange 34 mates with and is carried by circumferential flange 42. The inner surface of annular flange 34 rests on bearing seat wear pad 43, creating a closed top, except for the fastener through hole, covering bearing member 24.

Another embodiment of bushing assembly 20 may include inner sleeve 22, bearing member 24, and outer sleeve 26. Bearing member 24 engages inner sleeve 22 as described above. Outer sleeve 26 receives the outer periphery of bearing member 24 such that open center 52 frictionally engages the outer diameter of skirt 38. Open center 52 receives skirt 38 by a slip-fit assembly. Annular flange 54 receives and carries circumferential flange 42. The outer peripheral edge of circumferential flange 42 seats against the cup or cone-shaped end of annular flange 54. Annular flange 34 extends over circumferential flange 42 and annular flange 54, creating a closed top, except for the hole 58, surface covering bearing member 24.

Either of the described embodiments may be assembled without using a pressure assembly or a press fit, and either embodiment may be used in idler arm 64.

Idler arm 64 defines a central bore 66 which receives bushing assembly 20. One bushing assembly 20 is positioned in each side of central bore 66 as shown in FIG. 1. When assembled in the idler arm 64, bushing assembly 20 may include optional spacer 28. Spacer 28, as shown in FIGS. 2 and 3, is placed in idler arm 64 between two opposing bushing assemblies 20.

There are a variety of configurations which may be employed in forming the components described herein. Thus, the disclosed embodiments are given to illustrate the invention. However, they are not meant to limit the scope and spirit of the invention. Therefore, the invention should be limited only by the appended claims.

I claim:
1. A bushing assembly comprising:
   a bearing member comprising a skirt having tapered sidewalls defining a hollow center and a circumferential flange supported by the outer periphery of the upper end of the skirt, the skirt defining a slit therein for adjusting the dimensional tolerances of the bearing member; and
   an inner sleeve comprising a cylindrical body and an annular flange projecting from the outer periphery of the cylindrical body, the cylindrical body being received in the hollow center and the annular flange carried by the circumferential flange.
2. The bushing as defined in claim 1, wherein the slit extends into the circumferential flange.
3. The bushing as defined in claim 1, further comprising an outer sleeve comprising tapered sidewalls defining an open center which engages the outer periphery of the skirt and an annular flange extending from the outer periphery of the sidewalls.
4. A bushing for vehicular idler arms comprising:
   a vehicular idler arm defining a central bore at one end of the arm;
   a bushing subassembly received in opposite sides of the bore, the subassembly comprising
   a bearing member comprising a skirt having tapered sidewalls defining a hollow center and a circumferential flange supported by the outer periphery of the upper end of the skirt, the skirt defining a slit therein for adjusting the dimensional tolerances of the bearing member; and
   an inner sleeve comprising a cylindrical body and an annular flange projecting from the cylindrical body, the cylindrical body being received in the hollow center and the annular flange being carried by the circumferential flange.
5. The bushing as defined in claim 4, wherein the slit extends into the circumferential flange.
6. The bushing as defined in claim 4, wherein the subassembly further comprises an outer sleeve having tapered sidewalls defining an open center which engages the outer periphery of the skirt and an annular flange extending from the outer periphery of the sidewalls.
7. The bushing as defined in claim 4, wherein each subassembly engages a central stop disposed within the central bore.
8. The bushing as defined in claim 7, wherein the central stop includes zerk holes for receiving lubricant.
9. The bushing as defined in claim 8, wherein the central stop includes a bearing edge material stop for preventing deformation of the bushing subassembly when under load.
10. A bushing assembly comprising:
    a bearing member having a skirt with tapered sidewalls defining a hollow center and a circumferential flange supported by the outer periphery of the upper end of the skirt, the skirt defining a slit therein for adjusting the dimensional tolerances of the bearing member, the slit extending along the longitudinal extent of the skirt and into the adjacent surface of the circumferential flange;
    an inner sleeve having a cylindrical body and an annular flange projecting from the outer periphery of the cylindrical body, the cylindrical body frictionally engaging the hollow center of the bearing member and the annular flange resting on the circumferential flange; and
    an outer sleeve having tapered sidewalls defining an open center which receives the outer periphery of the skirt and an annular flange extending from the outer periphery of the sleeve and supporting the circumferential flange.

11. The bushing as defined in claim 10, wherein the annular flange of the outer sleeve is cup-shaped with tapered cone ends.

12. The bushing as defined in claim 10, wherein the annular flange of the inner sleeve includes tapered cone-shaped ends.

13. The bushing as defined in claim 10, wherein the inner sleeve comprises an inverted cup-shaped flange with tapered cone ends.

14. The bushing as defined in claim 10, wherein the inner sleeve comprises a flat flange.

15. The bushing as defined in claim 10, wherein a vehicle idler arm defining a central bore at one end thereof receives one bushing in opposite sides of the bore.

16. The bushing as defined in claim 15, wherein each bushing engages a central stop disposed within the central bore.

17. The bushing as defined in claim 16, wherein the central stop includes zerk holes for receiving lubricant.

18. The bushing as defined in claim 16, wherein the central stop includes a bearing edge material stop to prevent deformation of the bushing when under load.

19. The bushing as defined in claim 10, wherein the bearing member is fabricated using a polyurethane material.

\* \* \* \* \*